US010233583B1

United States Patent
Lynn

(10) Patent No.: US 10,233,583 B1
(45) Date of Patent: *Mar. 19, 2019

(54) SYSTEM WITH SERIALLY AND PARALLELLY CONNECTED OZONE GENERATORS FOR SUPPLYING A WATER-OZONE MIXTURE TO A LAUNDRY WASHING MACHINE

(71) Applicant: Daniel W. Lynn, Omaha, NE (US)

(72) Inventor: Daniel W. Lynn, Omaha, NE (US)

(*) Notice: Subject to any disclaimer, the term of this patent is extended or adjusted under 35 U.S.C. 154(b) by 82 days.

This patent is subject to a terminal disclaimer.

(21) Appl. No.: 15/642,794

(22) Filed: Jul. 6, 2017

Related U.S. Application Data

(63) Continuation-in-part of application No. 15/446,331, filed on Mar. 1, 2017, which is a continuation-in-part of application No. 15/355,884, filed on Nov. 18, 2016, which is a continuation-in-part of application No. 15/050,777, filed on Feb. 23, 2016.

(60) Provisional application No. 62/121,770, filed on Feb. 27, 2015.

(51) Int. Cl.
| | |
|---|---|
| *C02F 1/00* | (2006.01) |
| *C02F 9/00* | (2006.01) |
| *D06F 35/00* | (2006.01) |
| *D06F 33/02* | (2006.01) |
| *B01D 29/00* | (2006.01) |
| *B09C 1/00* | (2006.01) |
| *C05F 7/00* | (2006.01) |
| *C05F 9/00* | (2006.01) |
| *F25C 1/00* | (2006.01) |

(52) U.S. Cl.
CPC .............. *D06F 35/001* (2013.01); *C02F 9/00* (2013.01); *D06F 33/02* (2013.01); *D06F 35/005* (2013.01)

(58) Field of Classification Search
CPC ........ A01C 1/04; A61L 2/183; A61L 2202/11; A61M 1/16; B01D 17/0217; B01D 21/305; B01D 29/00; B09C 1/00; B01F 3/04503; B01F 5/04; B01F 5/0413; B01F 5/0428; B01F 2003/04886
USPC ...... 210/85, 87, 90, 96.1, 97, 136, 137, 150, 210/151, 192, 202, 259, 607, 614, 631, 210/724, 739, 741, 743, 746, 750, 760, 210/769
See application file for complete search history.

(56) References Cited

U.S. PATENT DOCUMENTS

| | | | |
|---|---|---|---|
| 6,006,387 A | * | 12/1999 | Cooper .................. A61L 2/202 68/13 R |
| 6,153,105 A | | 11/2000 | Tadlock et al. |
| 6,334,328 B1 | | 1/2002 | Brill |
| 6,685,825 B1 | | 2/2004 | Chang |
| 8,071,526 B2 | | 12/2011 | Lynn |
| 8,075,705 B2 | | 12/2011 | Lynn |
| 9,068,149 B2 | | 6/2015 | Lynn |
| 9,151,528 B2 | | 10/2015 | Erbs et al. |
| 9,174,845 B2 | | 11/2015 | Lynn |
| 9,522,348 B2 | | 12/2016 | Lynn |
| 2004/0004042 A1 | | 1/2004 | Hadley et al. |
| 2004/0168989 A1 | | 9/2004 | Tempest, Jr. |

(Continued)

*Primary Examiner* — Hayden Brewster
(74) *Attorney, Agent, or Firm* — Dennis L. Thomte; Thomte Patent Law Office LLC

(57) ABSTRACT

The instant invention relates to a system and method for supplying a water-ozone mixture to a large laundry washing machine. The system includes a plurality of ozone generators and a plurality of injectors for supplying a water-ozone mixture to the laundry washing machine.

1 Claim, 4 Drawing Sheets

(56) References Cited

U.S. PATENT DOCUMENTS

| | | |
|---|---|---|
| 2009/0142225 A1 | 6/2009 | Tornqvist |
| 2010/0219137 A1 | 9/2010 | Lacasse |
| 2013/0193081 A1 | 8/2013 | Vasiliu et al. |
| 2014/0033445 A1* | 2/2014 | Daniels .................. D06F 33/02 8/137 |
| 2014/0263097 A1 | 9/2014 | Lynn |
| 2016/0251243 A1 | 9/2016 | Lynn |

* cited by examiner

SYSTEM WITH SERIALLY AND PARALLELLY CONNECTED OZONE GENERATORS FOR SUPPLYING A WATER-OZONE MIXTURE TO A LAUNDRY WASHING MACHINE

CROSS-REFERENCE TO RELATED APPLICATIONS

This application is a Continuation-in-Part application of U.S. application Ser. No. 15/446,331 filed Mar. 1, 2017 entitled SYSTEMS AND METHODS FOR CREATING AN OXIDATION REDUCTION POTENTIAL (ORP) IN WATER FOR PATHOGENIC CONTROL WITH THE WATER AND OZONE SOLUTIONS THEREOF BEING SUPPLIED TO ONE OR MORE WASH-DOWN STATIONS which is a Continuation-in-Part Application of U.S. application Ser. No. 15/355,884 filed Nov. 18, 2016 entitled SYSTEMS AND METHODS FOR CREATING AN OXIDATION REDUCTION POTENTIAL (ORP) IN WATER FOR PATHOGENIC CONTROL which is a Continuation-in-Part of U.S. application Ser. No. 15/050,777 filed Feb. 23, 2016 entitled SYSTEMS AND METHODS FOR CREATING AN OXIDATION REDUCTION POTENTIAL (ORP) IN WATER FOR PATHOGENIC CONTROL which claims the benefit of U.S. Provisional Application Ser. No. 62/121,770 entitled SYSTEMS AND METHODS FOR CREATING AN OXIDATION REDUCTION POTENTIAL (ORP) IN WATER FOR PATHOGENIC CONTROL, all of which are hereby incorporated by reference thereto to complete this disclosure if necessary.

BACKGROUND OF THE INVENTION

Field of the Invention

This invention relates to improved systems and methods for creating an oxidation reduction potential (ORP) in water for pathogenic control and for other reasons. Even more particularly, this invention relates to a system and method for supplying a water-ozone mixture to a large laundry washing machine. Even more particularly, this invention relates to an improved system wherein the water-ozone mixture is supplied to a laundry washing machine which eliminates the need for the use of hot water and chemicals. Even more particularly, the invention relates to a system wherein the laundry, which is subjected to the water-ozone mixture of this invention, enhances the washing of the material in the washing machine with the washed material requiring less time to dry.

Description of the Related Art

Water intended for potable use (e.g., drinking water), may contain disease-causing organisms, or pathogens, which can originate from the source of the water, from resistance to water treatment techniques, from improper or ineffectual water treatment techniques, or so forth. Pathogens include various types of bacteria, viruses, protozoan parasites, and other organisms. To protect drinking water from disease-causing organisms, or pathogens, water suppliers often add a disinfectant, such as chlorine, to the water. However, disinfection practices can be ineffectual because certain microbial pathogens, such as *Cryptosporidium*, are highly resistant to traditional disinfection practices. Also, disinfectants themselves can react with naturally-occurring materials in the water to form byproducts, such as trihalomethanes and haloacetic acids, which may pose health risks.

A major challenge for water suppliers is how to control and limit the risks from pathogens and disinfection byproducts. It is important to provide protection from pathogens while simultaneously minimizing health risks to the population from disinfection byproducts. Oxidation reduction potential (ORP) can be used for water system monitoring to reflect the antimicrobial potential of the water, without regard to the water quality, with the benefit of a single-value measure of the disinfection potential, showing the activity of the disinfectant rather than the applied dose. The prior art does not provide systems and methods for providing an ozone-water mixture to large laundry washing machines.

The co-pending applications represent improvements in the art. The instant application represents a further improvement in the art in that the instant invention provides a system for supplying an ozone-water mixture to a large laundry washing machine. Large laundry washing machines, such as found in nursing homes, etc., utilize cold water and sometimes hot water as well as chemicals in an effort to cleanse the materials being laundered, such as bed sheets, pillow cases, pads, etc. The use of hot water in the washing machine and the use of chemicals in the washing machine increases the cost of laundering the materials in the washing machine. Further, the laundered materials require extensive drying.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A system is provided for creating an oxidation reduction potential (ORP) in water for supply to a large laundry washing machine having first and second water inlets. The system includes an injector box having first and second injectors therein with each of the injectors having a water inlet, an ozone inlet, and a water-ozone outlet. The water inlets of the first and second injectors are in fluid communication with a source of water under pressure. An ozone generator box is spaced from the injector box and has first, second, third, fourth, fifth and sixth ozone generators positioned therein.

The first ozone generator has an air inlet end and an ozone outlet end. The second ozone generator has an ozone inlet end and an ozone outlet end. The third ozone generator has an ozone inlet end and an ozone outlet end. The fourth ozone generator has an inlet end and an outlet end. The fifth ozone generator has an inlet end and an outlet end. The sixth ozone generator has an inlet end and an outlet end. The inlet end of the first ozone generator is in communication with a first air dryer. The outlet end of the first ozone generator is in communication with the inlet end of the second ozone generator. The outlet end of the second ozone generator is in communication with the inlet end of the third ozone generator.

The inlet end of the fourth ozone generator is in communication with a second air dryer. The outlet end of the fourth ozone generator is in communication with the inlet end of the fifth ozone generator. The outlet end of the fifth ozone generator is in communication with the inlet end of the sixth ozone generator.

The outlet end of the third ozone generator is in fluid communication with the ozone inlet of the first injector. The outlet end of the sixth ozone generator is in communication with the ozone inlet of the second injector. The water-ozone outlets of the first and second injectors are fluidly connected to the first and second water inlets of the washing machine respectively.

The use of the water-ozone mixture or fluid being supplied to the washing machine eliminates the need for hot water or chemicals. The use of the water-ozone fluid in the washing machine greatly enhances the cleansing of the material in the washing machine and substantially reduces the drying costs associated with the drying of the laundered material.

It is therefore a principal object of the invention to provide an apparatus for supplying a water-ozone fluid to a large laundry washing machine.

A further object of the invention is to provide a system for supplying a water-ozone fluid to a large laundry washing machine which eliminates the need of hot water and chemicals during the washing process.

A further object of the invention is to provide a system of the type described which greatly enhances the ability of the washing machine to launder the materials therein and which reduces the time needed to dry the laundered material.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
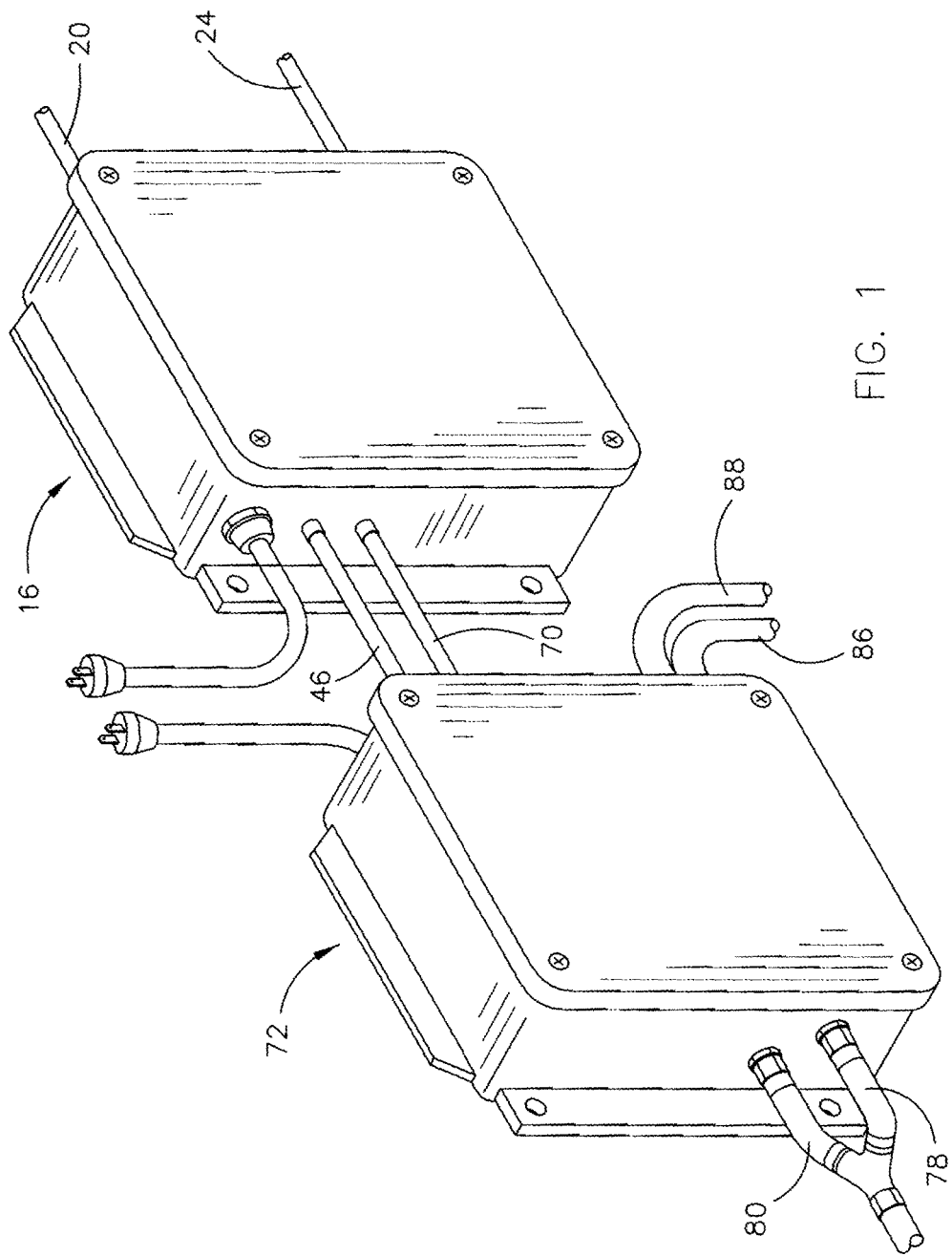
FIG. 1 is a partial perspective view of the system of this invention.
Figure 2:
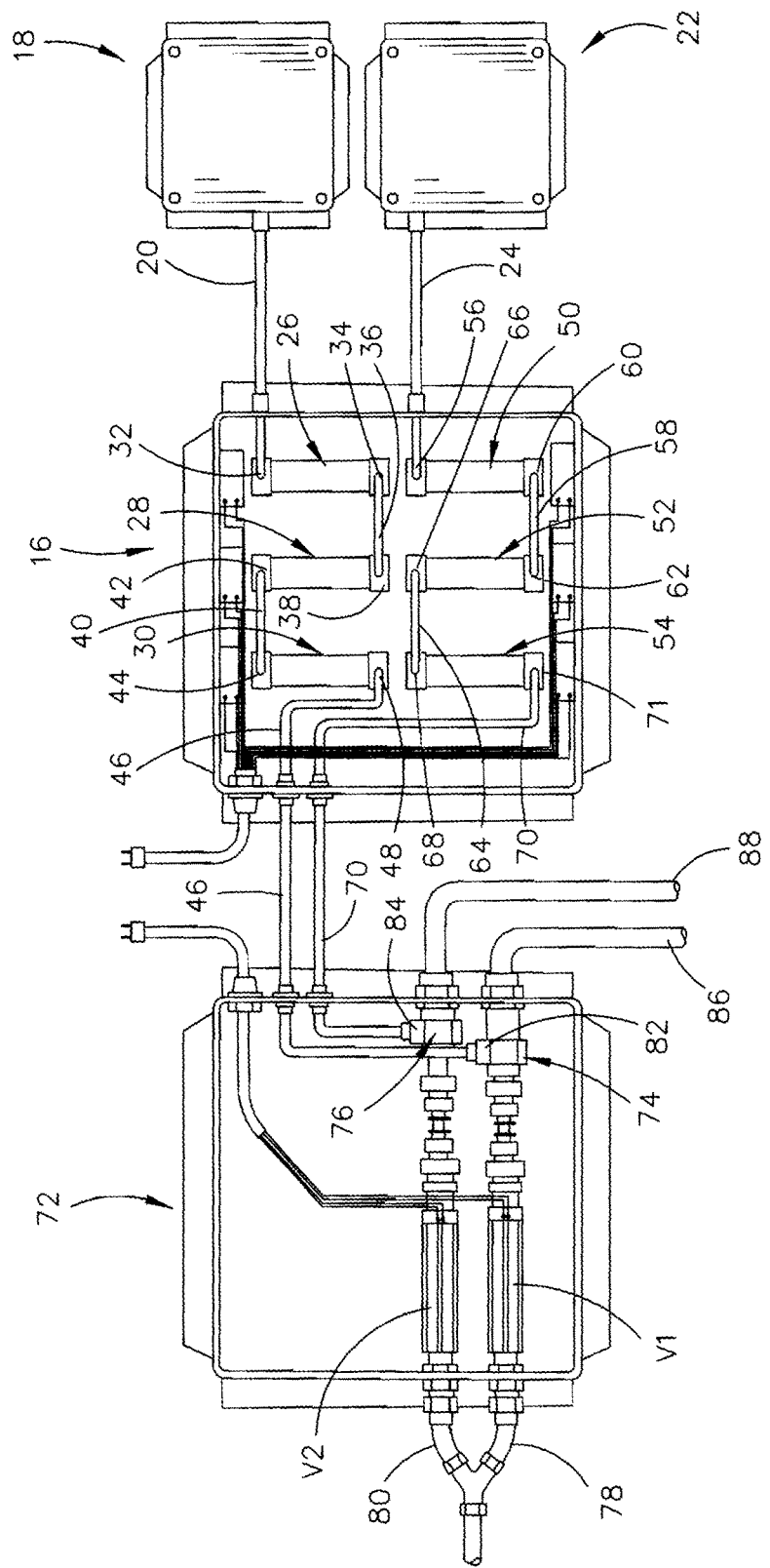
FIG. 2 is a schematic view of the system of this invention.
Figure 3:
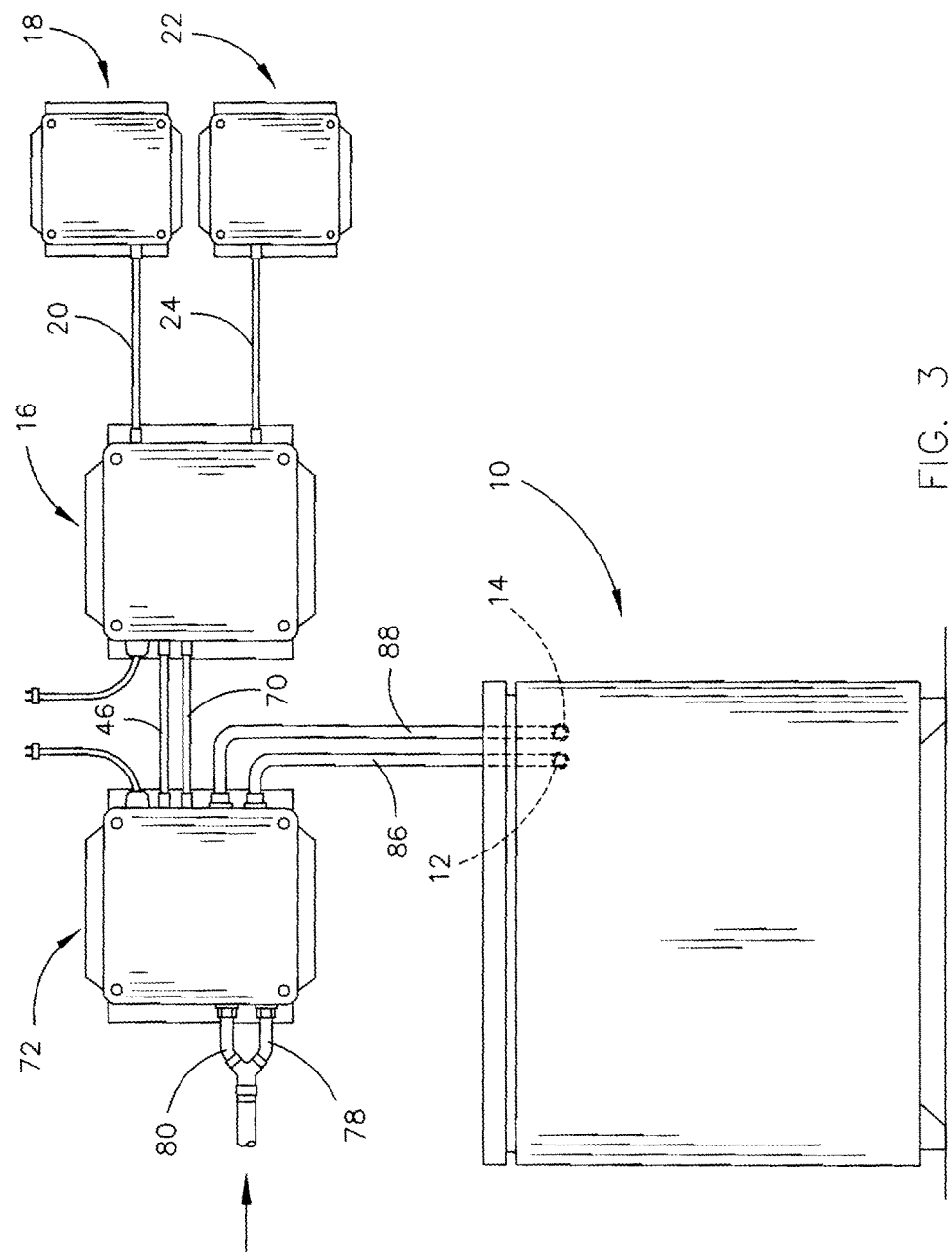
FIG. 3 is a side view of the system of this invention.
Figure 4:
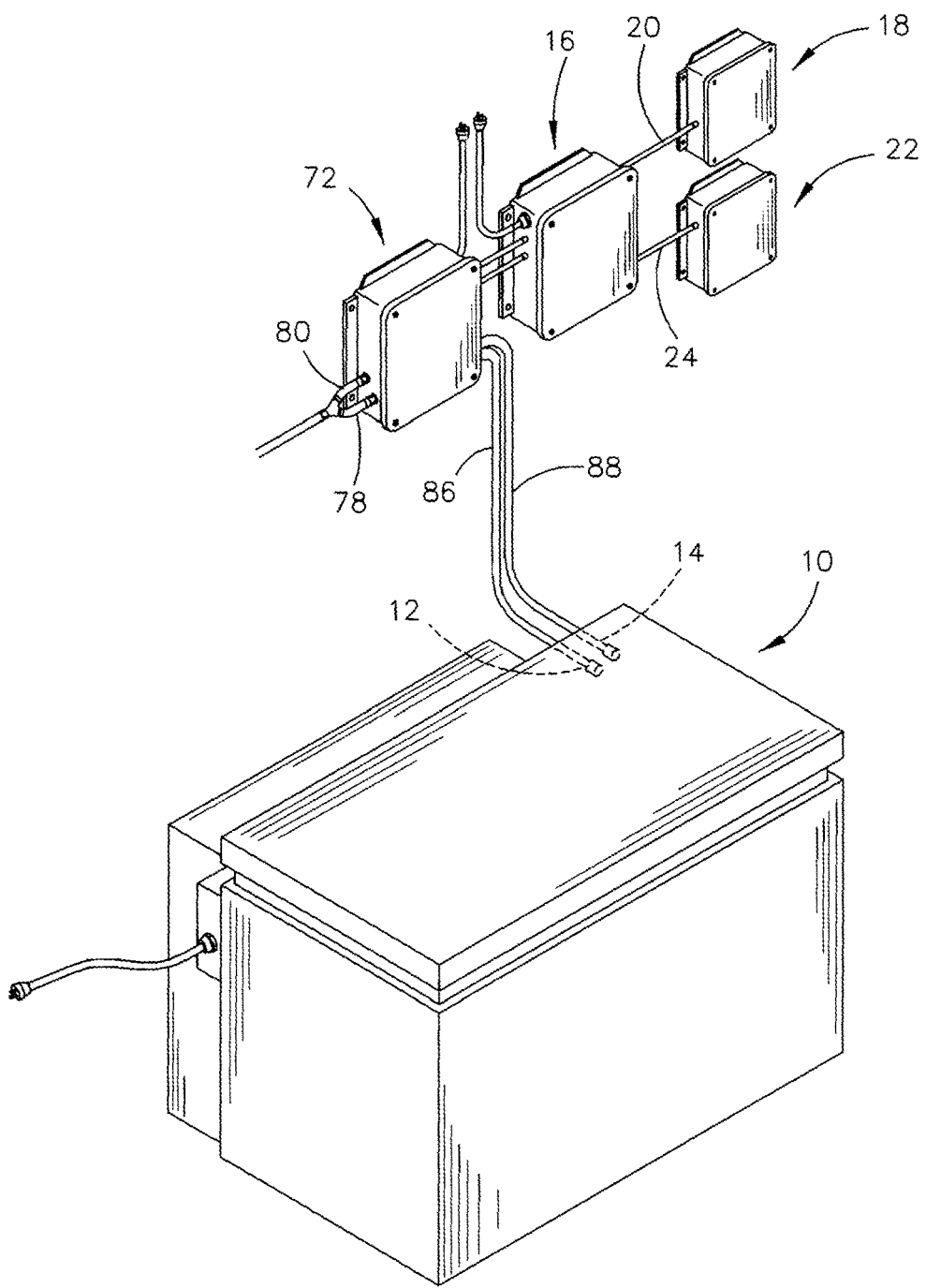
FIG. 4 is a perspective view of the system of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a large laundry washing machine such as used in nursing homes, care facilities, etc. Machine 10 may have a capacity of 50 pounds of laundry. Machine 10 will be described as having a first water inlet 12 and a second water inlet 14. In some cases, the machine 10 will have a single water inlet.

The numeral 16 refers to an ozone generator box or cabinet. A first air dryer 18 has an air line 20 extending therefrom into cabinet 16. A second air dryer 22 has an air line 24 extending therefrom into cabinet 16. Ozone generators 26, 28 and 30 are positioned in box 16 and are electrically connected to transformers in conventional fashion. Air line 20 is connected to the air inlet end 32 of ozone generator 26. A tube 36 connects the ozone outlet end 34 of ozone generator 26 and the ozone inlet end 38 of ozone generator 28. A tube 40 connects the ozone outlet end 42 of ozone generator 28 with the ozone inlet end 44 of ozone generator 30. An ozone line 46 extends from the ozone outlet end 48 of ozone generator 30.

As seen, ozone generators 50, 52 and 54 are also positioned in box 16. The ozone generators 50, 52 and 54 are electrically connected to transformers in conventional fashion. Air line 24 is connected to the air inlet end 56 of ozone generator 50. A tube 58 connects the ozone outlet end 60 of ozone generator 50 and the ozone inlet end 62 of ozone generator 52. A tube 64 connects the ozone outlet end 66 of ozone generator 52 and the ozone inlet end 68 of ozone generator 54. Tube 70 extends from the ozone outlet end 71 of ozone generator 54.

The numeral 72 refers to an injector box or cabinet. Injectors 74 and 76 of conventional design are positioned in box 72. The inlet side of injector 74 has a water line 78 extending therefrom to a source of water under pressure. A water valve may be positioned in line 78. An optional electrically controlled valve V1 may be imposed in line 78 inside box 72.

The inlet side of injector 76 has a water line 80 extending therefrom which is connected to the source of water under pressure. A water valve may be positioned in line 80. An optional electrically controlled valve V2 may be imposed in line 80 inside box 72. The ozone line 46 is connected to the ozone inlet 82 of injector 74. The ozone line 70 is connected to the ozone inlet 84 of injector 76. A line 86 extends from the outlet end of injector 74. A line 88 extends from the outlet end of injector 76. Lines 86 and 88 are connected to the water inlets 12 and 14 of machine 10 respectively.

The ozone-water fluid or mixture supplied to the machine 10 by the lines 86 and 88 provides sufficient ozone and water to the machine 10 which results in the material to be washed in a more efficient way without the use of chemicals or hot water. It has been found that the material being laundered in the machine 10 will require much less time to dry.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:
    a laundry washing machine having a first water inlet and a second water inlet;
    a system for supplying a water-ozone fluid to said laundry washing machine;
    said system comprising:
    an injector box;
    a first injector in said injector box;
    said first injector having a water inlet, an ozone inlet, and a water-ozone outlet;
    said water inlet of said first injector being in fluid communication with a source of water under pressure;
    a second injector in said injector box;

said second injector having a water inlet, an ozone inlet, and a water-ozone outlet;

said water inlet of said second injector being in fluid communication with a source of water under pressure;

an ozone generator box spaced from said injector box;

a first ozone generator positioned in said ozone generator box;

a second ozone generator positioned in said ozone generator box;

a third ozone generator positioned in said ozone generator box;

a fourth ozone generator positioned in said ozone generator box;

a fifth ozone generator positioned in said ozone generator box;

a sixth ozone generator positioned in said ozone generator box;

each of said first, second, third, fourth, fifth and sixth ozone generators having an inlet end and an outlet end;

a first air dryer;

said inlet end of said first ozone generator being in communication with said first air dryer;

said outlet end of said first ozone generator being in communication with said inlet end of said second ozone generator;

said outlet end of said second ozone generator being in communication with said inlet end of said third ozone generator;

said outlet end of said third ozone generator being in communication with said ozone inlet of said first injector;

a second air dryer;

said inlet end of said fourth ozone generator being in communication with said second air dryer;

said outlet end of said fourth ozone generator being in communication with said inlet end of said fifth ozone generator;

said outlet end of said fifth ozone generator being in communication with said inlet end of said sixth ozone generator;

said outlet end of said sixth ozone generator being in communication with said ozone inlet of said second injector;

a first water-ozone line having first and second ends;

said first end of said first water-ozone line being in fluid communication with said water-ozone outlet of said first injector;

said second end of said first water-ozone line being in fluid communication with said first water inlet of said laundry washing machine;

a second water-ozone line having first and second ends;

said first end of said second water-ozone line being in fluid communication with said water-ozone outlet of said second injector; and said second end of said second water-ozone line being in fluid communication with said second water inlet of said laundry washing machine.

\* \* \* \* \*